No. 615,333. Patented Dec. 6, 1898.
W. WILLIAMS & S. C. GALBRAITH.
COMBINATION PLOW AND STALK CHOPPER.
(Application filed May 19, 1897.)
(No Model.) 2 Sheets—Sheet 1.
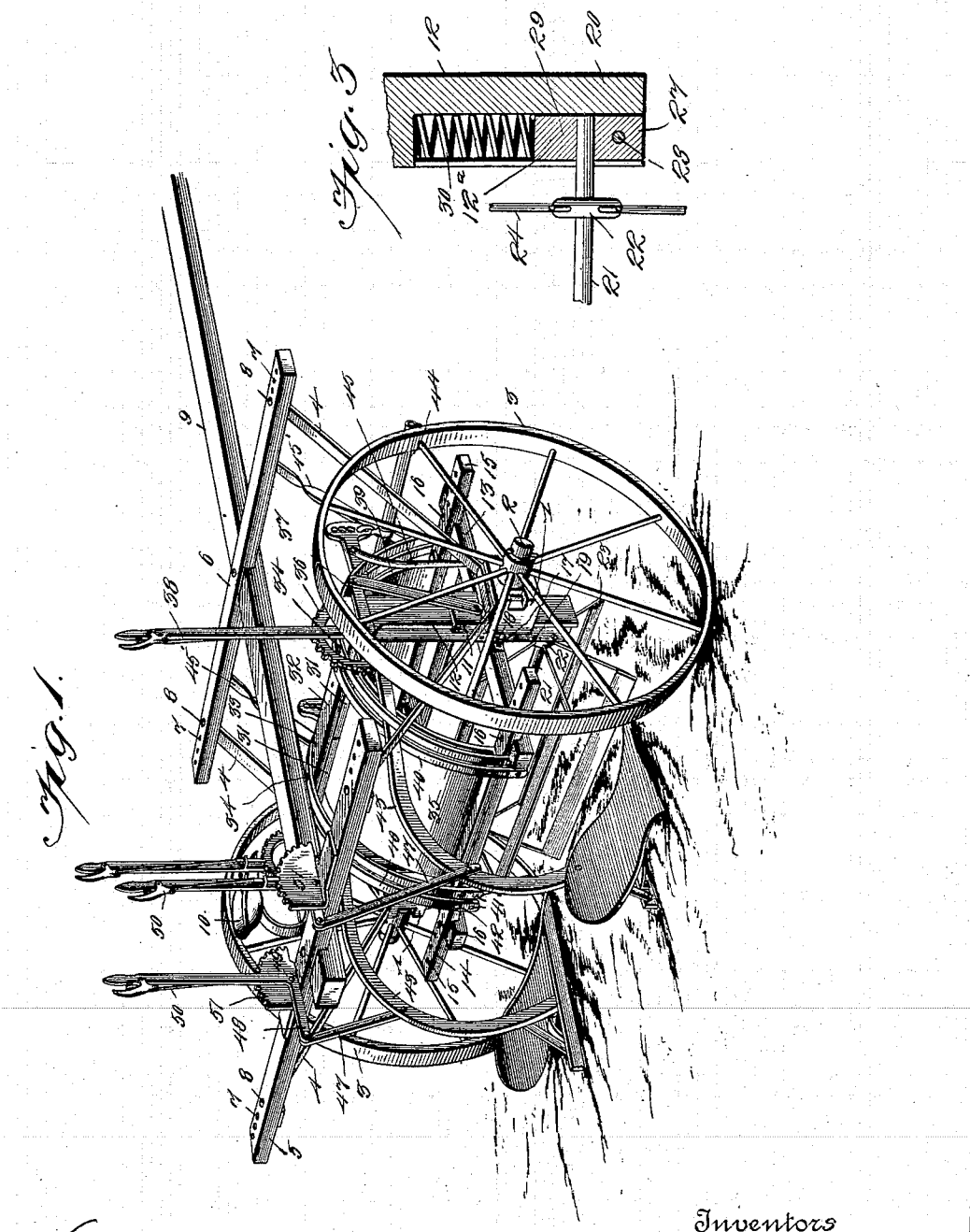
Witnesses
Inventors
Wood Williams,
Hansell C. Galbraith.
By John Wedderburn.
Attorney

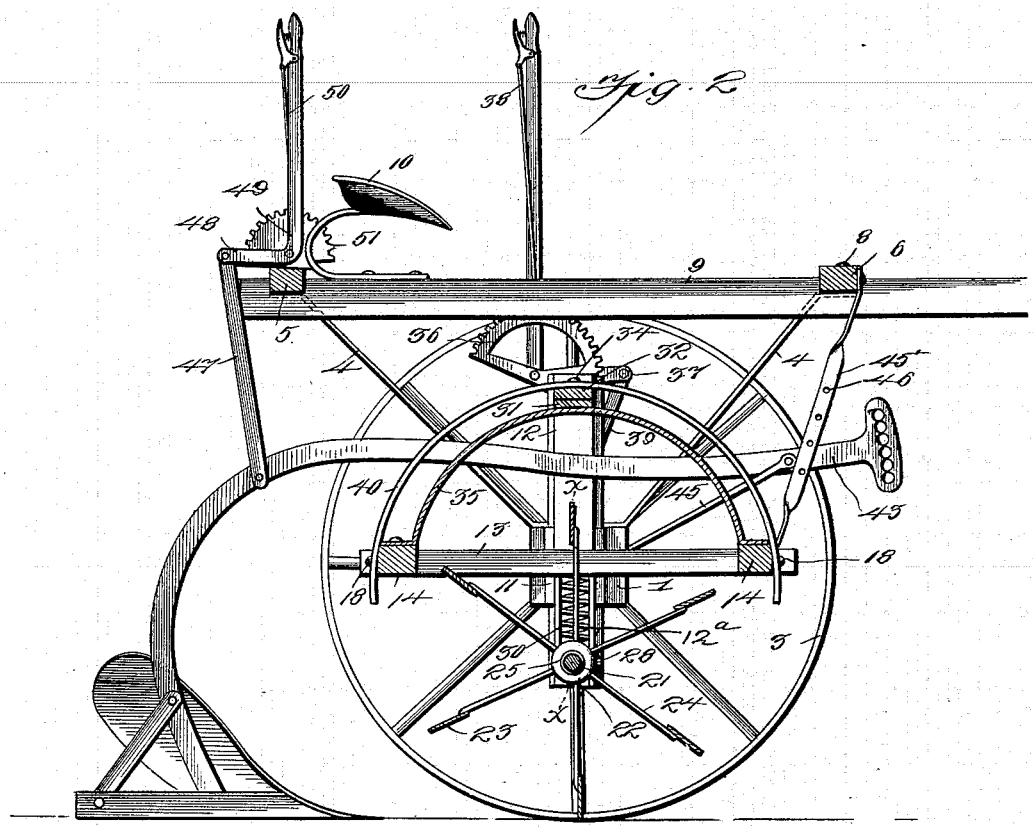

UNITED STATES PATENT OFFICE.

WOOD WILLIAMS AND STANSELL C. GALBRAITH, OF HONEY GROVE, TEXAS.

COMBINATION PLOW AND STALK-CHOPPER.

SPECIFICATION forming part of Letters Patent No. 615,333, dated December 6, 1898.

Application filed May 19, 1897. Serial No. 637,178. (No model.)

*To all whom it may concern:*

Be it known that we, WOOD WILLIAMS and STANSELL C. GALBRAITH, of Honey Grove, in the county of Fannin and State of Texas, have invented certain new and useful Improvements in a Combination Plow and Stalk-Chopper; and we do hereby declare the following to be a full, clear, and exact description of the invention, such as will enable others skilled in the art to which it appertains to make and use the same.

This invention relates to a combination plow and stalk-chopper; and it consists, essentially, of a wheeled frame having a specific formation adjustably and removably carrying a cotton or stalk chopper and means for arranging plows separately to operate on straddle-rows in cultivating cotton or other growths, and also forming a sweep or middle breaker to throw out the stalks.

The invention further consists of supporting devices whereby an ordinary plow having a curved or analogous beam may be applied to the machine without requiring a special construction and arrangement of the several parts.

The invention further consists of an adjustable frame to accommodate the various uses of the machine and also of means for changing the application of the draft from one point to another to accommodate the various operations.

The invention further consists in the details of construction and arrangement of the several parts, which will be more fully hereinafter described and claimed.

The object of the invention is to combine in one machine means for chopping stalks and attachments for the application and interchange of various forms of plows and the adjustment of two plows into a single form by simple and effective means, and to facilitate the cultivation of cotton or other growths and of the ground generally.

In the accompanying drawings, Figure 1 is a perspective view of a machine embodying the invention. Fig. 2 is a central longitudinal vertical section. Fig. 3 is a section on the line *x x*, Fig. 2. Fig. 4 is a detail perspective view of a plow shown united to form a sweep. Fig. 5 is a detail perspective view of another form of plow arranged as a sweep.

Referring to the drawings, wherein similar numerals of reference are employed to indicate corresponding parts in the several views, the numeral 1 designates opposite supports or blocks having extending therefrom axles 2, on which are rotatably mounted wheels 3. To the top portions of the said supports or blocks 1 the central parts of inverted arched braces 4 are secured and have their ends arranged at upward angles of inclination and adjustably connected to front and back cross-sills 5 and 6, each of which has a series of openings 7 in its outer ends for receiving bolts 8 and accommodating a lateral adjustment of said braces 4 when the parts of the machine are expanded or contracted. Secured to each of the cross-sills 5 and 6 and extending over the machine is a tongue 9, which is used at times for the attachment of draft-animals and also as a guide when the draft attachment is made at other points. On the rear of the tongue is a driver's seat 10, supported by suitable means. On the inner sides of the supports or blocks 1 flanged guides 11 are located and engage the inner flanged sides of supporting-posts 12, and to the said posts are attached longitudinal bars 13, having cross-bars 14 adjustably secured to the front and rear thereof. The said cross-bars 14 are formed with a series of openings 15 near their outer ends, which are engaged by bolts 16, and by this means an enlargement or decrease in the size of the frame composed of the said bars 13 and 14 may be readily attained. The said bars 13 are also provided with angle-plates 17, which are engaged by bolts 18, passing through one of a series of apertures 19 in the posts 12 to accommodate adjustment of the said bars 13 and the parts carried thereby in a vertical plane, which may primarily be made to raise or lower the parts relatively to the surface to be worked or to compensate for wear and independent of the operating adjustment, which will be hereinafter more particularly referred to. On the under side of the said bars 13 bearing-hangers 20 are secured, and therein are mounted the opposite parts of a shaft 21, on which are removably mounted rotatable heads 22, carrying a series of cutters 23 by means of radially-arranged arms 24. The said heads 22 are held by small collars 25, which sustain them in central position and against transverse movement. The opposite ends of the shaft 21 project into vertical slots 12ª at the inner lower portions of the posts 12, and in the lower portions of each are removable bearing-blocks 27, held in proper position in said slots under the shaft ends by bolts 28, extending transversely through the said posts, and resting on the said ends of the shaft are pressure-blocks 29, having coiled springs 30 above the same, and by this means the cutters 23 are permitted to yield when striking the ground and meeting with an obstruction to prevent breakage and also to facilitate the chopping action thereof. Secured directly to the top of the post 12 are inwardly-extending arms 31, and thereon is adjustably mounted a bolster 32, having a series of openings 33 near the outer ends thereof, a part of which are engaged by bolts 34, also extending through similar openings in the said arms, and by this means the lateral expansion or reduction of the bars 13 and 14 may be compensated for, and all the parts of the chopper-support may thus be increased or decreased in lateral extent.

The chopper is covered by a suitably-curved metallic sheathing 35, which extends from one bar 14 to the other and stands sufficiently above the chopper to permit proper adjustment thereof without contact. On opposite sides of the posts 12 are toothed segments 36, having bell-crank levers 37, pivotally attached thereto and provided with long arms extending upwardly to within convenient engaging distance of the driver's seat 10. On the said long arms of the bell-crank levers spring-actuated engaging rods 38 are mounted and adapted to have their lower ends take into the teeth of the segements, and to the short arms of the said bell-crank levers links 39 are movably attached, and also to the guides 11, and by this means the posts 12 and the parts carried thereby can be raised from or lowered toward the ground in order to secure an operative adjustment of the chopper, and also permit plow attachments, which will be more fully set forth, to be adjusted relatively to the work being done. On opposite sides of the covering or sheathing 35 and extending across the top of the sill 32 are parallel guide-braces 40, which have their lower ends adjustably connected to the cross-bars 14 through the medium of a series of openings 41, formed in said guide-braces, engaged by removable bolts 42. These braces are arranged in pairs and spaced apart from each other a sufficient distance to permit the introduction therein of curved or analogous plow-beams 43, which, as shown in Fig. 1, are arranged for straddle-row cultivation, and it is intended that any plow now in use having a curved beam may be inserted between the said guide-braces and used without requiring the purchase or manufacture of a specially-constructed plow, thereby saving considerable expense to a farmer or planter. The guide-braces are also carried with the adjustable parts heretofore set forth in increasing or decreasing the lateral extent of the machine, and by this means different widths of furrows can be engaged, and consequently cotton or other growths can be cultivated by a single machine of the character set forth.

When the plow-beams are arranged, as shown in Fig. 1, for straddle-row work, single-trees 44 are attached to suitable clevises at the ends of said beams and the draft-animals hitched thereto, the tongue 9 then passing between the animals and serving as a guide. To steady the front ends of the plow-beams, a brace-rod 45 is removably connected to each and movably attached to the outer corners of the supports or blocks 1. This connection also institutes an equalization of the draft upon all parts of the machine, and as a further means of attaching the draft-animals during various operations of the machine metallic straps 45' are secured to the opposite sides of the front of the cross-sill 5 and to the front cross-bar 14. Said straps have half-twists within the body thereof intermediate of the opposite ends, in which a series of openings 46 are formed for the attachment of single or double trees, as the work may require, and it will be observed that by this means the said attachment may be made at an elevation or depression in accordance with the operation desired.

The plow-beams 43 are adjustable, and consequently the plows carried thereby, and to secure this adjustment links 47 are connected thereto and extend upwardly and are movably attached to the short arms 48 of bell-crank levers 49, whose longer arms are situated adjacent to the driver's seat 10 and have spring-actuated dogs 50 thereon to engage toothed segments 51, carried by the rear cross-sill 6.

In the arrangement of the parts to provide a sweep the two plows and the beams supporting the same are brought together and unitedly passed through one pair of the guide-braces 40, and two forms of arranging such plows are shown in the drawings by Figs. 4 and 5. Each of the plows, as shown, is formed with an outer moldboard and an inner open straight side, so that the two plows may be brought together and form a sweep or middle breaker, the parts being connected by various means, as will now be described.

In Fig. 4 the plows are united by a removable angle-iron plate or clip 52, which extends upwardly over the joint thereof and downwardly under the point, adjustable bolts 53 being used to connect the several parts.

In Fig. 5 the ordinary form of removable front plate or point section commonly used in plows is detached, and in lieu thereof is mounted a continuous angle-iron plate or double point 54. This form of the device is used in breaking up or bursting a ridge containing cotton or other stalks and forms a central furrow, which throws the soil, together with stalks, on opposite sides and under.

It will be understood that during some of the operations of the machine the chopper adjustment will be disconnected to remove it and prevent hindrance of operation of the other parts. Under ordinary circumstances, however, the said chopper is adapted to be raised high enough to prevent obstruction to the several uses to which the machine can be put, and at such times it will remain intact. Also during various uses it will be necessary to arrange the draft-animals to equalize the line of draft at all points through the medium of doubletrees and positioning more animals on one side of the tongue 9 than on the other. It will also be observed that the machine can be used either on the right or left without in the least detracting from its utility, and also other plows may be attached thereto from time to time for different forms of cultivation.

In operation the stalk-cutter when used rolls over the ground and exerts a pressure through the weight of the machine sufficient to sever the stalks.

The advantages of the several devices heretofore set forth are many, and among the most important may be mentioned the mode of attaching to a carriage or sulky one right and one left hand plow for turning, so arranged as to be adjustable for listing or barring off rows, each plow being adapted to work independent of the other and to be raised out of the ground or adjusted laterally. By this means each side of a row may be barred at one operation, thereby saving considerable time and labor. By placing the two plows together by means of bolts or otherwise a complete sweep or middle breaker is attained and can be attached to the same carriage or sulky and requires less power to secure the desired result in view of the fact that it is shaped to cut and not drag. The preferred form of sweep will be that shown with a right and left plowshare and a solid point with suitable fastenings.

Having thus described the invention, what is claimed as new is—

1. In a machine of the character set forth, the combination of an adjustable frame, individual plow-beams having plows thereon adjustably carried by said frame, plows comprising outer moldboards and inner open sides and adapted to be united, and a removable angle-plate for uniting them to form a single plow.

2. In a machine of the character set forth, the combination of a frame having parallel guiding-braces adjustable laterally from or toward each other, and plow-beams carrying plows with outer moldboards and inner open sides, the said plow-beams being adjustably and removably mounted in said guide-braces and adapted to be brought together in one of the braces to form a sweep or middle breaker, substantially as and for the purposes specified.

3. In a machine of the character set forth, the combination of an adjustable frame, adjustable posts adapted to movably support a cotton or other stalk chopper, parallel guide-braces on the said frame, plow-beams adjustably mounted in the said braces and each carrying a plow having an outer moldboard and an inner open side to adapt the two plows to be joined in one device, and means for adjusting the several parts, substantially as described.

4. In a machine of the character set forth, the combination of supports or blocks having axles extending therefrom, upper front and rear sills having openings therein near the outer ends thereof, braces attached to said supports or blocks, and removably engaging the openings in said sills, a tongue attached to said sills, adjustable plows, wheels mounted on the said axles, and a laterally-adjustable frame below said sills and adapted to regulate the positions of the plows relatively to each other, substantially as described.

5. In a machine of the character set forth, the combination of an adjustable frame, a stalk-chopper removably and rotatably carried by a part of said frame, a metallic sheathing thereover, pairs of guide-braces on opposite sides of said sheathing, and plow-beams supporting plows adjustably and removably engaging said guide-braces, substantially as described.

6. In a combined wheel-plow and stalk-chopper of the character set forth, the combination with the frame thereof, of a right and a left hand plow, plow-beams therefor, pivotally connected with the frame, laterally-adjustable guide-braces on opposite sides of said beams, and means for adjusting the plows laterally and vertically, substantially as described.

7. In a combined wheel-plow and stalk-chopper of the character set forth, the combination with the frame thereof, of right and left plows adapted to be joined to form a single plow, and a removable angle-plate for connecting said plows to form a single sweep on the forward curved edges thereof, substantially as described.

In testimony whereof we have signed this specification in the presence of two subscribing witnesses.

WOOD WILLIAMS.
STANSELL C. GALBRAITH.

Witnesses:
EDWD. B. FOX,
GEO. WEDDERBURN.